United States Patent
Mohamed

(10) Patent No.: US 8,198,207 B2
(45) Date of Patent: Jun. 12, 2012

(54) BORANE CATALYST COMPLEXES WITH AMIDE FUNCTIONAL POLYMERS AND CURABLE COMPOSITIONS MADE THEREFROM

(75) Inventor: Mustafa Mohamed, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 633 days.

(21) Appl. No.: 12/298,214

(22) PCT Filed: Feb. 6, 2007

(86) PCT No.: PCT/US2007/003062
§ 371 (c)(1),
(2), (4) Date: Oct. 23, 2008

(87) PCT Pub. No.: WO2007/139596
PCT Pub. Date: Dec. 6, 2007

(65) Prior Publication Data
US 2009/0123703 A1 May 14, 2009

Related U.S. Application Data

(60) Provisional application No. 60/802,749, filed on May 23, 2006.

(51) Int. Cl.
*B32B 27/28* (2006.01)
*B01J 31/18* (2006.01)
*C08L 83/04* (2006.01)
*C08F 4/52* (2006.01)
*B01J 27/02* (2006.01)

(52) U.S. Cl. ........ 502/202; 502/158; 502/167; 502/232; 428/343; 428/355; 428/446; 428/447; 428/156

(58) Field of Classification Search .................. None
See application file for complete search history.

(56) References Cited

U.S. PATENT DOCUMENTS

| | | | |
|---|---|---|---|
| 2,676,182 A | | 9/1950 | Daudt et al. |
| 3,275,611 A | | 9/1966 | Mottus et al. |
| 4,282,346 A | | 8/1981 | Sharkey |
| 4,584,355 A | | 4/1986 | Blizzard et al. |
| 4,585,836 A | | 4/1986 | Homan et al. |
| 4,591,622 A | | 5/1986 | Blizzard et al. |
| 5,795,657 A | * | 8/1998 | Pocius et al. .................. 428/516 |
| 5,929,194 A | | 7/1999 | Woo et al. |
| 5,981,680 A | | 11/1999 | Petroff et al. |
| 6,051,216 A | | 4/2000 | Barr et al. |
| 6,410,667 B1 | | 6/2002 | Moren |
| 6,534,581 B1 | | 3/2003 | Kleyer et al. |
| 6,620,515 B2 | | 9/2003 | Feng et al. |
| 6,706,831 B2 | | 3/2004 | Sonnenschein et al. |
| 6,730,759 B2 | | 5/2004 | Sonnenschein et al. |
| 6,762,260 B2 | | 7/2004 | Sonnenschein et al. |
| 6,777,512 B1 | | 8/2004 | Sonnenschein et al. |
| 6,815,468 B2 | | 11/2004 | Nixon et al. |
| 6,825,298 B2 | | 11/2004 | Sonnenschein et al. |
| 7,928,174 B2 | * | 4/2011 | Ahn et al. ..................... 526/198 |

FOREIGN PATENT DOCUMENTS

| | | |
|---|---|---|
| JP | 63-230781 | 9/1988 |
| WO | WO 01/32716 A1 | 5/2001 |
| WO | WO 01/32717 A2 | 5/2001 |
| WO | WO 01/68363 A1 | 9/2001 |
| WO | WO 2006/073695 A1 | 7/2006 |

OTHER PUBLICATIONS

Isobe, Yutaka, et. al., "Efficient Lewis Acid-Catalyzed Stereocontrolled Radical Polymerization of Acrylamides," Journal of American Chemical Society, 2001, pp. 7180-7181, vol. 123.

Hirano, Tomohiro, et. al., "Hydrogen-Bond-Assisted Stereocontrol in the Radical Polymerization of N-Isopropylacrylamide with Primary Alkyl Phosphate: The Effect of Chain Length of the Straight Ester Group," Journal of Polymer Science, 2005, pp. 50-62, vol. 43, Wiley Periodicals, Inc.

Soderquist, John A., et. al., "Convenient and Regiospecific Route to Functionalized Organosilanes Through Hydroboration of Alkenylsilanes," Journal of Organic Chemistry, 1980, pp. 3571-3578, vol. 45.

* cited by examiner

*Primary Examiner* — Melvin C Mayes
*Assistant Examiner* — Yun Qian
(74) *Attorney, Agent, or Firm* — Erika Takeuchi

(57) ABSTRACT

Borane catalyst complexes with amide functional polymers have a borane portion of the complex that may contain at least one silicon atom. The catalyst complexes can be used as components in curable compositions containing (i) the catalyst complex, (ii) a free radical polymerizable monomer, oligomer or polymer, and optionally (iii) a decomplexer. The curable compositions may contain a component capable of generating a gas, as well as various other optional ingredients. These curable compositions can be used as rubbers, tapes, adhesives, protective coatings, thin films, thermoplastic monolithic molded parts, thermosetting monolithic molded parts, sealants, foams, gaskets, seals, o-rings, pressure sensitive adhesives, die attachment adhesives, lid sealants, encapsulants, potting compounds, conformal coatings, and electronic components. The compositions can also be used in composite articles of manufacture in which substrates are coated or bonded together with the composition and cured, such as in connectors, diving masks, or other integrally bonded parts.

2 Claims, No Drawings

BORANE CATALYST COMPLEXES WITH AMIDE FUNCTIONAL POLYMERS AND CURABLE COMPOSITIONS MADE THEREFROM

CROSS REFERENCE TO RELATED APPLICATIONS

This application is a U.S. national stage filing under 35 U.S.C. §371 of PCT Application No. PCT/US07/003,062 filed on 6 Feb. 2007, currently pending, which claims the benefit of U.S. Provisional Patent Application No. 60/802,749 filed 23 May 2006 under 35 U.S.C. §119 (e). PCT Application No. PCT/US07/003,062 and U.S. Provisional Patent Application No. 60/802,749 are hereby incorporated by reference.

DESCRIPTION

1. Technical Field

Borane catalyst complexes with amide functional polymers ("catalyst complexes") are suitable as initiators for curing various curable compositions. Curing is defined herein as a chemical reaction such as polymerization or crosslinking that results in an increase in average molecular weight of the polymerizable compound such that the composition thickens or hardens.

A curable composition including the catalyst complex and a composite article including the curable composition and at least one substrate are disclosed. The curable compositions may provide the advantage of being capable of curing at low temperatures.

Methods of making composite articles in which the curable composition is in the form of an adhesive may be performed at a temperature lower than temperatures previously employed. The substrate to which the adhesive is applied and the adhesive composition may bond together at a lower temperature to make composite articles.

2. Background

As used herein, the symbols M, D, T, and Q represent the functionality of the structural units of polyorganosiloxanes including organosilicon fluids, resins, and cured products thereof. These symbols are used in accordance with the established understanding in the silicone industry. M represents the monofunctional unit $R_3SiO_{1/2}$; D represents the difunctional unit $R_2SiO_{2/2}$; T represents the trifunctional unit $RSiO_{3/2}$; and Q represents the tetrafunctional unit $SiO_{4/2}$. R represents an atom or a substituent group such as an organic group. The structural formulae of these units are shown below.

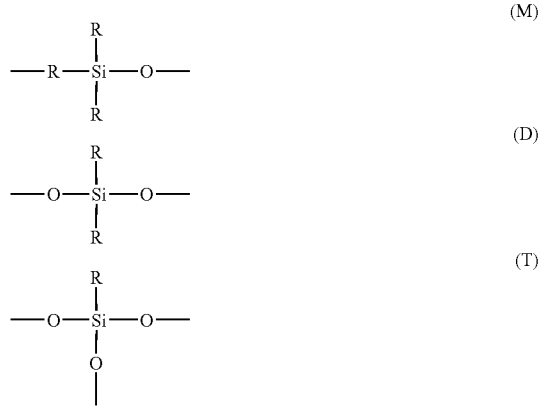

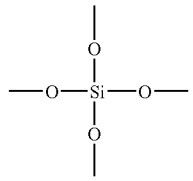

Organoborane amine complexes are known. For example, organoborane amine complexes used for the polymerization of acrylic monomers are described in U.S. Pat. No. 3,275,611 (Sep. 27, 1966). Organoboron compounds such as trialkylboranes by themselves are pyrophoric in the presence of oxygen, so preformed complexes between organoboron compounds and amine compounds are noted to have the benefit of imparting improved stability to organoboron compounds such as trialkylboranes.

Some recent developments in the structure of certain organoborane amine complexes are described in U.S. Pat. No. 6,706,831 (Mar. 16, 2004), including the use of the complexes in acrylate based adhesives. The combination of alkylborane amine complexes with amine reactive decomplexing agents to initiate polymerization of acrylic adhesives at room temperature is also disclosed. However, after polymerization the amine complexing agent and the decomplexing agent remain in the composition unreacted, such unreacted species could out-gas causing air bubbles and lead to adhesion failure.

U.S. Pat. No. 6,777,512 (Aug. 17, 2004), referred to hereafter as the '512 patent, describes certain polymerizable silicone compositions containing an organoborane amine complex, one or more compounds having unsaturation capable of free radical polymerization, combined with compounds having a siloxane backbone and reactive moieties capable of cure, and a catalyst for curing the siloxane. Such compositions offer the advantage of forming addition curable products with good adhesion to low energy substrates without inhibition problems associated with hydrosilylation curable compositions. The organoborane compound used to form the organoborane-amine complex is described as a trialkyl borane or an alkylcycloalkyl borane having the formula $BR'_3$ where R' is a $C_{1-10}$ alkyl group, a $C_{3-10}$ cycloalkyl group, or a structure in which two or more of the R' groups combine to form a cycloaliphatic ring. One limitation of such trialkylborane-based catalysts however is their tendency to bleed or bloom to the surface after curing has been completed because of limited compatibility with the matrix, particularly in the case of non-polar matrices such as silicones.

The '512 patent also discloses known amine compounds containing silane or organosiloxane compounds for forming complexes with trialkylborane compounds. The grafting of silicon-containing groups on amine complexing agents can lead to improvements in certain properties including improved compatibility with silicones before cure, depending on the nature of the silicon-containing group. However, when the amine compound is dissociated from the trialkylborane compound to initiate the curing reaction, the boron compound remains unmodified such that many of the aforementioned limitations of prior art compositions remain. The '512 patent does not disclose any organoborane-amine catalysts where any of the R' groups attached to boron contain a silicon atom.

Generally, curable organosilicon compositions and their uses are known including organopolysiloxane containing compositions. In such applications, it is desirable to use addition-curable materials since volatile by-products are not generated during reactions in curing such materials. One example of a suitable addition-curable material is a silicone based elastomer that cross-links upon cure by hydrosilylation. Such materials can be used for a variety of applications such as molded rubber parts, release coatings, pressure-sensitive adhesives, cure-in-place adhesives, and coatings or encapsulants for the protection and passivation of electronic circuit boards.

However, the use of hydrosilylation chemistry for curing materials such as these is limited because hydrosilylation catalysts including platinum are susceptible to poisoning or inhibition by small quantities of compounds containing nitrogen, phosphorous, sulfur, tin, and arsenic, that strongly associate with such catalysts. This results in the formation of improperly formed or uncured products and limits the type and concentration of additives that can be used to modify the hydrosilylation curable composition. In addition, the presence of active hydrogen as an alcohol, acid, and even water can react with the organohydrogenpolysiloxane to create undesirable side reactions.

Therefore, additives and impurities containing hydrosilylation catalyst inhibiting groups that may be present during the curing process tend to reduce the cure rate or the physical properties of the hydrosilylation curable composition. In cases where the inhibiting groups are present on the surface of a substrate, development of adhesion between the substrate and the hydrosilylation curable composition may require substantially higher cure temperatures than usual. In severe cases, adhesion and cure may even be prevented altogether by the presence of inhibiting groups.

Curable organosilicon compositions using condensation curing catalysts are also known. For example, U.S. Pat. No. 6,534,581 (Mar. 18, 2003) describes certain compositions containing an organopolysiloxane with silicon bonded hydroxy groups, a crosslinking agent, an electrically conductive filler, and a condensation type catalyst. These compositions do not contain an easily poisoned hydrosilylation group catalyst, and so condensation curing organosilicon compositions offer the advantage of low temperature curing. However, condensation curing requires the diffusion of moisture and so condensation curable compositions can take a significantly longer time to cure in a confined geometry or in deep section. Thus the '581 patent points out that the compositions can be cured in 10-20 hours at room temperature or in less than about 16 hours at 70° C. In applications such as the assembly and packaging of electronic products, an extended cure time introduces costly delays in the manufacturing process. Further, condensation curable compositions are capable of generating volatile by-products such as alcohols that lead to the formation of voids from out-gassing.

When the addition curable composition is free radical curable, the use of catalysts such as organic peroxides requires high temperatures to initiate the cure, or results in limited storage stability at ambient conditions. Further, free radical cures initiated by organic peroxides are easily inhibited in the presence of atmospheric oxygen leading to uncured or poorly cured products, or undesirable decomposition by-products are generated.

In addition, because high temperatures are needed to develop adhesion with the existing addition curable organosilicon compositions, the out-gassing of entrained volatile materials such as water from the substrate or from within the curable composition leads to the formation of undesirable voids or bubbles in joints formed between the silicone based elastomer and the substrate to which it is applied. This problem is particularly acute with hygroscopic polar polymeric substrates such as polyesters, polyamides, polyimides, and epoxy resins. To overcome the problem, the components used to make the compositions often require pre-drying that entails additional process steps and drying equipment in the manufacturing process. Also, the temperatures needed for curing the addition curable organosilicon compositions exceed the thermal stability limits of some polymeric substrates and/or the components mounted thereon. While other examples of external treatment methods for the surfaces of components exist such as application of a primer or exposure to high energy sources such as plasma, corona, or ultraviolet light, even these treatment methods require additional processing time or costly equipment, or both, in the manufacturing process.

Problems to be Solved

Due to the deficiencies associated with compositions as noted above, there is a need for compositions that cure rapidly at lower temperatures, or shorter times, or both, with improved surface properties, and that eliminate the need of pre-drying and external treatments of surfaces to which the compositions are applied. Due to deficiencies associated with organopolysiloxane based materials as noted above, there is a need for compositions that are able to cure rapidly at a lower temperature, or shorter time, or both with improved surface properties and resistance to common cure inhibitors, and that possess unique advantages in properties attributed by organosilicon based matrices in general. Furthermore, there is a need to produce one-part curable compositions having improved pot life, improved shelf life, or both.

SUMMARY OF THE INVENTION

A catalyst complex comprises a borane compound and an amide-functional polymer.

DETAILED DESCRIPTION OF THE INVENTION

Catalyst Complex

The borane catalyst complex with an amide-functional polymer (catalyst complex) is a complex formed between a borane compound optionally containing at least one silicon atom, and a suitable amide-functional polymer that renders the complex stable under conditions of use, preferably under ambient conditions. The borane compound may be an organoborane free of silicon atoms. Alternatively, the borane compound may be an organosilicon functional borane, wherein the borane contains at least one silicon atom. Organosilicon is defined herein as meaning any silicon atom containing group, siloxane oligomer containing group, or siloxane polymer containing group. The catalyst complex may have the formula:

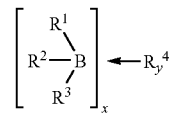

In the formula, subscript x is one or more, subscript y is one or more, B represents boron; $R^1$, $R^2$, and $R^3$ are groups that can be independently selected from hydrogen; a cycloalkyl group; a linear or branched alkyl group having 1-12 carbon atoms on the backbone; an alkylaryl group; an organosilane group such as an alkylsilane or an arylsilane group; an organosiloxane group; an alkylene group capable of functioning as a covalent bridge to another boron atom; a divalent organosiloxane group capable of functioning as a covalent bridge to another boron atom; or substituted analogs thereof. The term "analogs" means chemical compounds with structurally similar nuclei but with different chemical moieties. At least one of the $R^1$, $R^2$, or $R^3$ groups may optionally contain one or more silicon atoms, and the silicon-containing group is covalently attached to boron. $R^4$ is an amide-functional polymer capable of complexing boron.

$R^1$, $R^2$, and $R^3$ are exemplified by hydrogen, an alkyl group containing 1-10 carbon atoms, a halogen substituted alkyl group containing 1-10 carbon atoms, or an organosilicon functional group. Two or more of the $R^1$, $R^2$, and $R^3$ substituents can combine to form heterocyclic structures, provided the sum of the number of atoms from the two combining groups does not exceed 11. Alternatively, the silicon containing group is such that the boron atom is separated from the nearest silicon atom by at least one covalent bond, and alternatively by at least two covalent bonds. Organoborane compounds that do not contain silicon are known in the art and are commercially available, for example, from Aldrich.

4,-epoxycyclohexyl)ethyl, and 5,6-epoxyhexyl groups; ester functional groups such as acetoxymethyl and benzoyloxypropyl groups; and hydroxyl functional groups such as hydroxy and 2-hydroxyethyl groups.

Some representative examples of suitable organosilicon functional boron compounds that can be used to form the complex include the following compounds having various combinations of $R^1$, $R^2$, and $R^3$ groups. In these formulae, b has the same value as defined above.

Organosilicon Functional Boron Compound 1

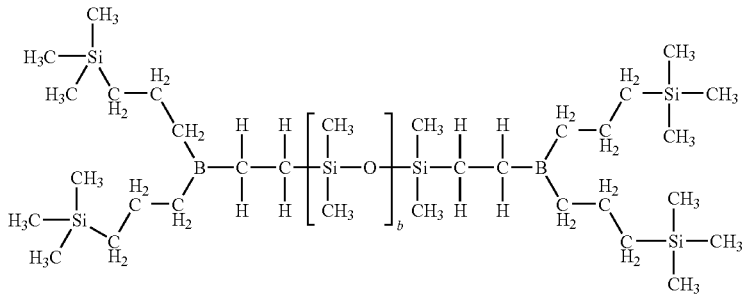

The borane portion of the complex ($R^1R^2R^3B$) optionally contains a silicon functionality (i.e., a silane or a siloxane functionality). The silicon functionality can comprise any group containing both silicon and boron atoms. The boron and silicon atoms can be linked by any carbon, nitrogen, sulfur, or oxygen containing group.

Some examples of groups suitable as $R^1$, $R^2$, and $R^3$ groups include $R^5_3SiCH_2CH_2CH_2$—, $(R^5O)_3SiCH_2CH_2CH_2$—, $R^5_3SiCH_2CH_2$—, $(R^5O)_3SiCH_2CH_2$—, $(R^5O)_3SiCH_2CH_2CH_2CH_2CH_2CH_2CH_2$—, $(R^5O)_3SiCH_2CH_2CH_2OC(O)CH_2CH_2$—, $(R^5O)_3SiCH_2CH_2CH_2OC(O)CH(CH_3)$—, $(R^5O)_3SiCH_2CH_2CH_2OC(O)CH(CH_3)CH_2$—, $(R^5O)_3SiCH_2CH_2CH_2OC(O)CH(CH_3)_2$—, and $CH_2=CH-(CH_2)_a-(Si(R^5)_2-O)_bSi(R^5)_2-(CH_2)_a-CH_2-CH_2-$.

In these groups, subscript a may range from zero to 20 and subscript b may range from 1 to 1,000. When two or more of the $R^1$, $R^2$, and $R^3$ groups combine to form heterocyclic structures with the boron atom, some representative examples of suitable groups that can be used include: —$CH_2CH_2CH_2Si(R^5)_2CH_2CH_2CH_2$—; —$CH_2CH_2Si(R^5)_2CH_2CH_2$—; and —$CH_2CH_2Si(R)_2OSi(R^5)_2CH_2CH_2$—.

Some examples of monovalent groups suitable as the $R^5$ group include hydrogen; halogen; alkyl groups such as methyl, ethyl, propyl, and butyl groups; alkenyl groups such as vinyl, allyl, and butenyl groups; acrylic functional groups such as acryloxymethyl, 3-acryloxypropyl, methacryloxymethyl, and 3-methacryloyloxypropyl groups; alkynyl groups such as ethynyl and propynyl groups; aromatic groups such as phenyl, tolyl, and xylyl groups; cyanoalkyl groups such as cyanomethyl, cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkylene) groups such as allyloxy(polyoxyethylene), allyloxypoly(oxypropylene), and allyloxy-poly(oxypropylene)-co-poly(oxyethylene) groups; alkyloxypoly(oxyalkylene) groups such as propyloxy(polyoxyethylene), propyloxypoly(oxypropylene), and propyloxy-poly(oxypropylene)-co-poly(oxyethylene) groups; halogen substituted alkyloxypoly(oxyalkylene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; epoxyalkyl groups such as glycidoxy methyl, 3-glycidoxypropyl, 2-(3, Organosilicon Functional Boron Compound 2

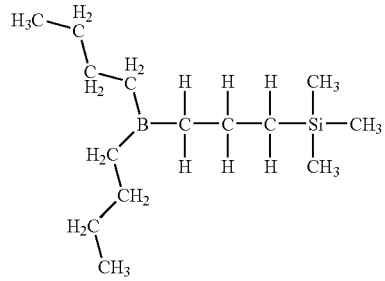

Organosilicon Functional Boron Compound 3

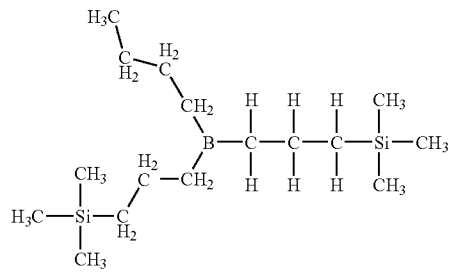

Organosilicon Functional Boron Compound 3A

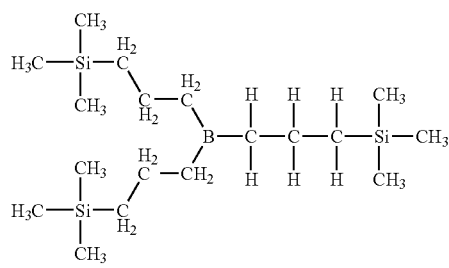

Organosilicon Functional Boron Compound 4

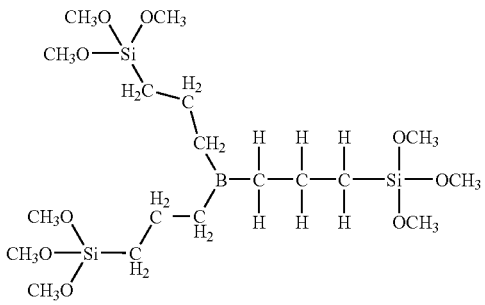

Organosilicon Functional Boron Compound 5

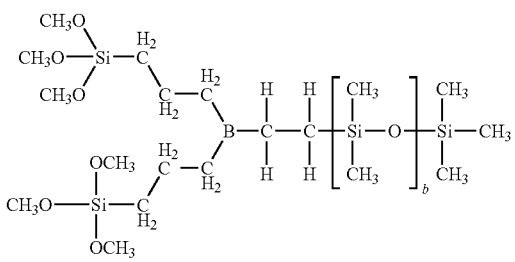

Organosilicon Functional Boron Compound 6

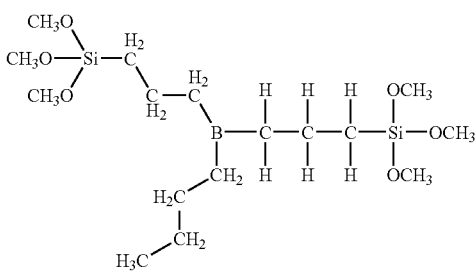

Organosilicon Functional Boron Compound 7

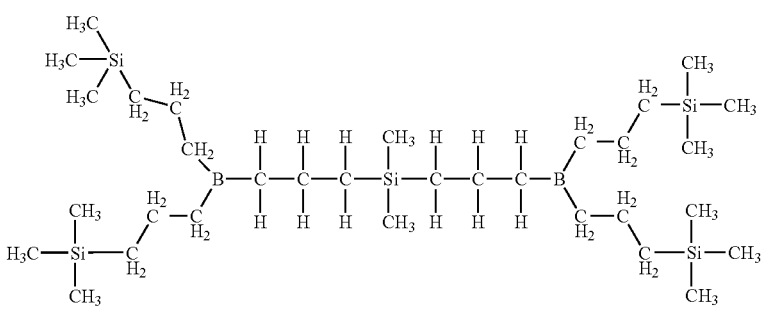

Organosilicon Functional Boron Compound 8

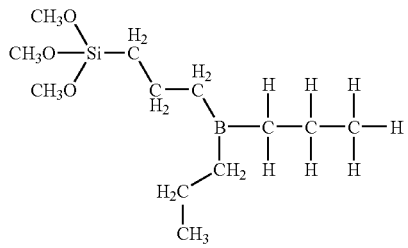

When two or more of the $R^1$, $R^2$, and $R^3$ groups combine to form heterocyclic structures with the boron atom, some representative examples of suitable organosilicon functional boron compounds that can be used to form the complex include the following three compounds, in which y has the same value as defined above:

Organosilicon Functional Boron Compound 9

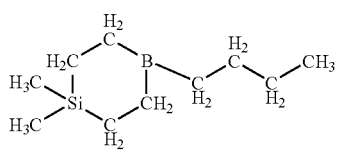

Organosilicon Functional Boron Compound 10

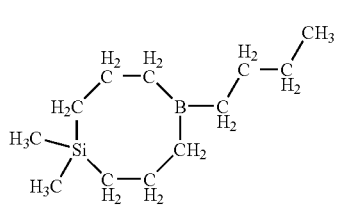

Organosilicon Functional Boron Compound 11

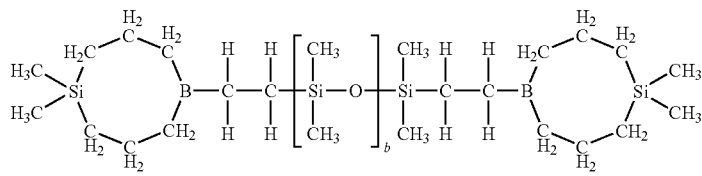

The heterocyclic structures can be synthesized by techniques such as illustrated in the following reaction scheme as exemplified by the following scheme where 9-BBN represents 9-borabicyclo[3,3,1]nonane. As illustrated, the bicyclic ring is depicted as commonly shown in chemical literature relating to boron compounds, and reference may be had to *The Journal of Organic Chemistry,* 1980, Volume 45, Pages 3571-3578, in the paper entitled *Convenient and Regiospecific Route to Functionalized Organosilanes through Hydroboration of Alkenylsilanes,* by John A. Soderquist and Herbert C. Brown.

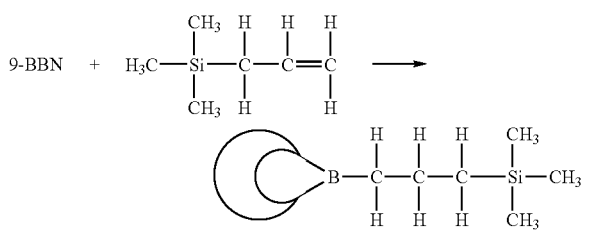

Another example of a genus of organosilicon functional borane compounds that can be used to form the catalyst complex is shown below. In this genus, boron is bonded to an organopolysiloxane through a bridge of at least two covalent bonds. In the organopolysiloxane backbone, the boron atom may be attached at terminal or pendant locations:

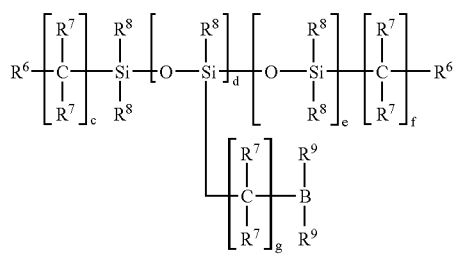

As illustrated, $R^6$ is hydrogen, a halogen, an alkyl group, an alkoxy group, a cycloalkyl group, an aryl group, a halogen substituted alkyl group or a halogen substituted cycloalkyl group, or the group $—B(R^9)_2$. When $R^6$ is $—B(R^9)_2$, then subscripts c and f should have a value of at least one and not more than twelve. $R^7$ is hydrogen, a halogen, a branched or linear alkyl group, or a halogen-substituted linear or halogen-substituted branched alkyl group. $R^8$ represents the same type of groups as previously defined for $R^6$. The $R^9$ groups represent the same type of groups as previously defined for the $R^1$, $R^2$, and $R^3$ groups. The values of subscripts c, d, and f each range from zero to 20; the value of e ranges from 1 to 20,000; and the value of g ranges from 1 to 12.

The article by Soderquist and Brown noted above, and the references cited therein, provide numerous examples and detailed synthetic routes for making the organosilicon functional borane part of the catalyst complex through hydroboration reactions. For example, one facile general route involves the reaction of a borane-tetrahydrofuran complex with a terminally unsaturated organosilicon compound. It is known in the art that such reactions generally can produce a mixture of products derived from the addition of the boron to either the α penultimate position or the β terminal position of the carbon of the double bond. It is noted that the specific examples of structures illustrated herein show only β hydroboration products for the sake of simplicity. However, it should be understood that the α product, or a mixture of β and α products, may also be used as the organosilicon-functional borane part of the catalyst complex. The organosilicon functional borane compound may be such that at least 20 mol percent, alternatively at least 50 mol percent, of the organosilicon-functional groups attached directly to boron, are derived from the β terminal adduct.

The amide-functional polymer $R^4$ comprises at least one divalent group of formula (I):

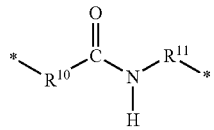

where $R^{10}$ is a divalent organic group, a divalent silicone group, or a divalent silicone-organic block copolymer and $R^{11}$ is a divalent organic group or a divalent silicone-organic block copolymer. Divalent organic groups for $R^{10}$ may be linear or branched and are exemplified by aliphatic hydrocarbon groups, polyether, and polyurethane. Divalent silicone groups are exemplified by polydimethylsiloxane, polydiphenylsiloxane, and polymethylphenylsiloxane. Alternatively, $R^{10}$ may be a divalent hydrocarbon group. The divalent hydrocarbon group for $R^{10}$ may be branched or linear. The divalent hydrocarbon group for $R^{10}$ may be saturated. The divalent hydrocarbon group for $R^{10}$ may have 2 to 30 carbon atoms, alternatively 3 to 12 carbon atoms. $R^{11}$ may be a divalent hydrocarbon group. The divalent hydrocarbon group for $R^{11}$ may be branched or linear. The divalent hydrocarbon group for $R^{11}$ may be saturated. The divalent hydrocarbon group for $R^{11}$ may have 2 to 30 carbon atoms, alternatively 3 to 12 carbon atoms.

In one embodiment, $R^{11}$ may have the formula:

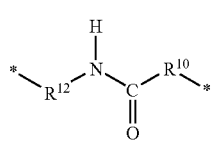

yielding an amide-functional polymer containing at least one group of formula (II):

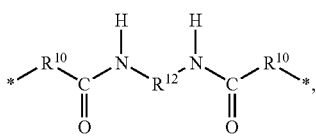

where $R^{12}$ is a divalent organic group or a divalent silicone-organic block copolymer. Divalent organic groups for $R^{12}$ may be linear or branched and are exemplified by aliphatic hydrocarbon groups, polyether, and polyurethane.

Alternatively, $R^{12}$ may be a divalent hydrocarbon group. Divalent hydrocarbon groups for $R^{12}$ can be branched or linear. Divalent hydrocarbon groups for $R^{12}$ may have 2 to 40 carbon atoms, alternatively 2 to 20 carbon atoms, alternatively 2 to 10 carbon atoms, and alternatively 2 to 6 carbon atoms.

Alternatively, $R^{12}$ may be a divalent organic group comprising a hydrocarbon substituted by, for example, at least one of hydroxy; a cycloalkyl group of 3 to 8 carbon atoms; 1 to 3 members each independently selected from alkyl groups of 1 to 3 carbon atoms, unsubstituted phenyl groups, and phenyl groups substituted by 1 to 3 members each independently selected from alkyl groups of 1 to 3 carbon atoms; a hydroxyalkyl group of 1 to 3 carbon atoms; and an alkyl amino group of 1 to 6 carbon atoms.

Divalent organic groups for $R^{12}$ may comprise a hydrocarbon chain containing at least one of (i) 1 to 3 amide linkages; (ii) a cyclic, divalent, saturated hydrocarbon group of 5 or 6 carbon atoms; and (iii) a phenylene optionally substituted by 1 to 3 members selected each independently from alkyl groups of 1 to 3 carbon atoms.

$R^{12}$ can be a group of the formula $R^{14}T(R^{15})R^{16}$, where $R^{14}$ and $R^{16}$ are divalent hydrocarbon groups of 1 to 10 carbon atoms and $R^{15}$ is a monovalent or divalent hydrocarbon group of 1 to 10 carbon atoms, such groups being independent of one another, and T is $C(R^{17})$, where $R^{17}$ can be hydrogen; a trivalent N, P or Al; the divalencies and trivalencies herein should be understood and taken to allow for branching, cross linking or the like in certain instances and as appropriate; an alkyl group such as methyl, ethyl, propyl, isopropyl; a halogenated alkyl group such as trifluoropropyl; a chain comprising siloxane such as a polydimethylsiloxane or a siloxane based polyamide; or an aryl group such as phenyl, wherein the phenyl may optionally be substituted by 1 to 3 members independently selected from methyl and ethyl.

The amide-functional polymer $R^4$ may have general formula (III):

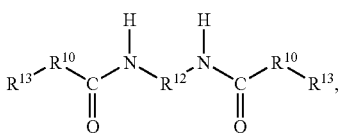

where $R^{10}$ and $R^{12}$ are as described above and $R^{13}$ is a monovalent endblocking group. $R^{13}$ may be a reactive or non-reactive group. Reactive groups for $R^{13}$ are exemplified by groups containing a functionality such as hydroxyl; hydrolyzable moieties such as alkoxy such as methoxy, ethoxy, and butoxy; hydride; unsaturation such as vinyl; and isocyanate. Reactive groups could be free radical reactive groups such as double bond or condensation curable groups such alkoxysilane or isocyanates. In formula (III), each $R^{10}$ may be a divalent, linear hydrocarbon group of 2 to 30, alternatively 2 to 12 carbon atoms. In formula (III), $R^{12}$ may be a polyether, polyurethane, silicone such as polydimethylsiloxane, polydiphenylsiloxane, polymethylphenylsiloxane, or a block copolymer of any of such silicone and organic groups.

Amide-functional polymers for $R^4$ may be prepared from known techniques using diamine of the general formula:

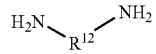

where $R^{12}$ is as described above. The diamine may be, for example, an alkyl diamine, a polyoxyalkylamine, or an aromatic amine. Examples of the diamines include aliphatic diamines such as ethylenediamine, hexamethylene diamine, aromatic diamines, polyamines, and polyoxyalkylene diamines.

The amide-functional polymers may be prepared by the reaction of the diamine with species that have an amine reactive group such as aldehyde, isocyanate, anhydride, or carboxylic acid. A wide variety of carboxylic acids may be used, including but not limited to aliphatic carboxylic acid, unsaturated aliphatic acids, aromatic, aryl substituted, alkenyl substituted carboxylic acids.

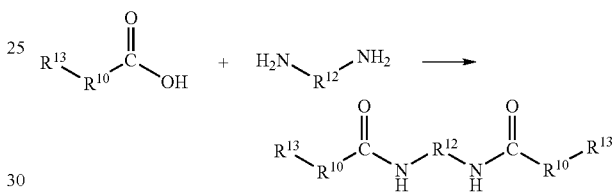

where $R^{10}$, $R^{12}$, and $R^{13}$ are as described above. $R^{13}$ may contain a reactive functionality such that when polymerization is initiated the amide functional polymer participates in polymerization and chemically reacts in the composition. The reactive functionality for $R^{13}$ may be independently selected from the group consisting of hydride, olefinic unsaturation, hydroxyl, isocyanate, and hydrolyzable moieties. Reactive groups could be free radical reactive groups such as double bond or condensation curable groups such alkoxysilane or isocyanates. The reactive group reacts in the matrix eliminating presence of unreacted species in the composition.

$R^{13}$ may be an unsaturated functional group, which can be prepared from the reaction of carboxylic acids such as 4-pentenoic acid, 2-pentenoic acid, 3-pentenoic acid, octenoic acid, undecylenic acid with the diamine.

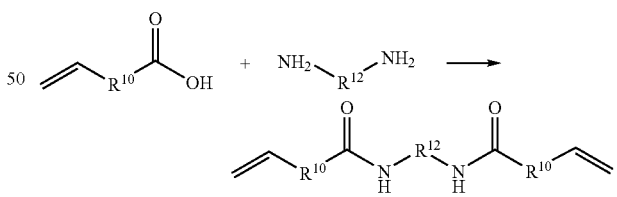

Alternatively, $R^{13}$ may be a moisture curable functional group such as alkoxysilane prepared as shown below.

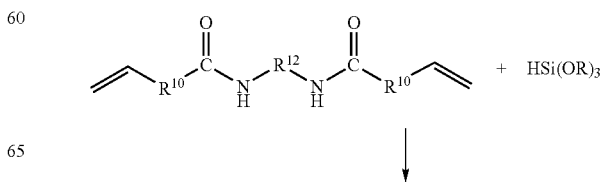

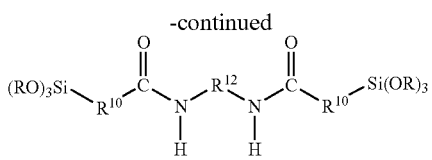
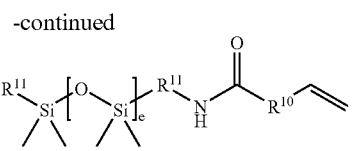

R is as described above. $R^{12}$ may be a divalent organic group containing at least one polyoxyalkylene group having the formula $—(C_hH_{2h}O)_i—$, where subscript h ranges from 2 to 4 inclusive, subscript i ranges from 1 to 700, alternatively 1 to 100, or alternatively 1 to 20. The polyoxyalkylene group may comprise oxyethylene units $—(C_2H_4O)—$, oxypropylene units $—(C_3H_6O)—$, oxybutylene units $—(C_4H_8O)—$, or combinations thereof. If more than one oxyalkylene group is present, the oxyalkylene units can be arranged in any fashion to form either a block or randomized copolymer structure, alternatively a randomized copolymer group. The polyoxyalkylene block may comprise both oxyethylene units $(C_2H_4O)$ and oxypropylene units $(C_3H_6O)$. The polyoxyalkylene group may be bonded to each of the nitrogen atoms via a divalent hydrocarbon group, which is independently selected from alkyl groups having 2 to 5 carbon atoms such as ethyl, propyl, butyl and their isomers, alternatively an isopropylene group, $—CH(CH_3)CH_2—$, or ethylene group $—CH_2CH_2—$ The diamines useful for making $R^4$ may contain at least one polyoxyalkylene group having the formula $—(C_hH_{2h}O)_i—$, where h and i are as described above. The polyoxyalkylenediamines are also commonly known as polyetherdiamines, and may be for example poly(oxyethylene)diamines or poly(oxypropylene)diamines. Such diamines may include polyoxyalkylenepolyamines such as polyethyleneoxidediamine, polypropyleneoxidediamine, polypropyleneoxidetriamine, diethyleneglycoldipropylamine, triethyleneglycoldipropylamine, polytetramethyleneoxidediamine, poly(ethyleneoxide-co-propyleneoxide)diamine, poly(ethyleneoxide-co-propyleneoxide)triamine. Polyoxyalkylene-diamines are known in the art, and many are commercially available. Representative, non-limiting examples of suitable polyoxyalkylene-diamines include; XTJ-502 poly(oxyethylene) diamine, XTJ-504 triethyleneglycoldiamine, JEFFAMINE® HK-511 polyetherdiamine, JEFFAMINE® D-230, JEFFAMINE® D-400, and JEFFAMINE® D-2000 polyoxypropylenediamines.

Alternatively, an amine functional silicone used to prepare $R^4$ may be silicones with pendent or terminal amine groups. Useful diamine materials are commercially available from Gelest: Bis(3-aminopropyl)-tetramethyldisiloxane, DMS-A11, DMSA12, DMS-A15, DMS-A21, DMS-A21, DMS-A31, DMSA32.

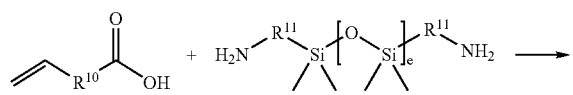

Alternatively, the amide-functional polymer $R^4$ may be a silicone-organic block copolymer comprising units of formula (IV), formula (V), or a combination thereof.

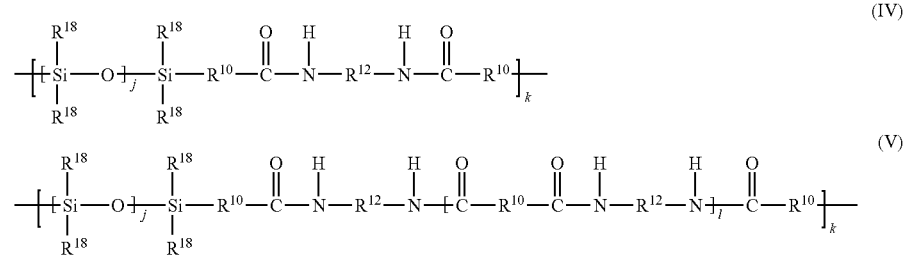

Subscript j represents an average value for degree of polymerization of the siloxane units as shown in formula (IV) with this average being a number average based on all the siloxane segments in all units in formula (IV). Variation in individual j values is possible. Subscript j may range from 1 to 700, alternatively 10 to 500, alternatively 12 to 50, alternatively 15 to 45, alternatively 15 to 30, and alternatively 15 to 18.

Subscript k may range from 1 to 300, alternatively 4 to 200, alternatively 45 to 125, alternatively 55 to 80, and alternatively 60 to 80. Without wishing to be bound by theory, it is thought that increasing the value of k increases the melt viscosity of the silicone-organic block copolymer.

In formulae (IV) and (V), $R^{10}$ is as described above, and $R^{12}$ is a divalent organic group as described above. Each of $R^{18}$ is independently selected from the group consisting of an alkyl group, a halogenated alkyl group, a chain comprising siloxane, and an aryl group. Alternatively, each $R^{18}$ is independently methyl, ethyl, propyl, isopropyl, a halogenated alkyl group such as trifluoropropyl, a chain comprising siloxane (such as a polydimethylsiloxane or a siloxane based polyamide), and phenyl, wherein the phenyl may optionally be substituted by 1 to 3 members independently selected from methyl and ethyl. Alternatively, each $R^{18}$ is selected from methyl and ethyl. Alternatively, each $R^{18}$ is methyl.

The individual values for j, $R^{10}$, and $R^{12}$ may be the same or different for each unit of the silicone-amide block copolymer (which may include those between any of the k units of formula (IV)). Such variation may or may not also exist for the $R^{10}$ groups within each of the k units of formula (IV). Individual $R^{12}$ groups may be aliphatic, aromatic or both.

When used in reference to formula (IV), and unless otherwise indicated, the term "siloxane group" refers to a group having siloxane units such as:

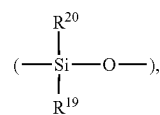

where, $R^{19}$ and $R^{20}$ are each independently selected from organic moieties, and each of $R^{19}$ and $R^{20}$ are connected to the silicon by a carbon-silicon bond. Further, in formula (IV), the carbon numbers in $R^{10}$ and $R^{12}$ do not include the carbons in any optional segments or substitutions. Also, the silicone-amide block copolymers have a siloxane portion in the backbone and optionally may have a siloxane portion in a pendant or branched portion.

Acceptable variations of formula (IV) include: (1) silicone-amide block copolymers in which multiple values of j, $R^{10}$, and $R^{12}$ occur in one polymeric molecule (which may include variation between the k units of formula (IV) and even within $R^{10}$ groups), wherein the sequencing of these units may be alternating, random or block; (2) silicone-amide block copolymers in which an organic triamine or higher amine such as tris(2-aminoethyl)amine replaces the organic diamine in part, to produce a branched or cross linked molecule; and (3) physical blends of any of (1) and (2) or alternating block copolymers, or combinations thereof.

Formula (IV) represents an alternating block copolymer or $(AB)_k$ type copolymer. Depending on how the copolymer of formula (IV) is endblocked, formula (IV) can represent a $B(AB)_k$ or a $A(BA)_k$ type copolymer. Formula (IV) may be endblocked with an amide group, a tri-substituted silicone group, or both.

In formula (V), $R^{10}$, $R^{12}$, j, and k are as defined above for formula (IV). Subscript l is an integer with a value that may range from 1 to 18. The molar ratio of l/k is at least 0.1. Subscript k represents an average value for degree of chain extension by condensation chemistry of the amide segment. If subscript k is 0 then the structure of formula (V) reverts to formula (IV). Subscript l may range from 1 to 60, alternatively 2 to 55, and alternatively 10 to 55. Variation in individual l values is possible. Formula (V) represents an alternating block copolymer or $(AB)_k$ type copolymer. Depending on how the copolymer of formula (V) is endblocked, formula (V) can represent a $B(AB)_k$ or a $A(BA)_k$ type copolymer. Formula (V) may be endblocked with an amide group, a tri-substituted silicone group, or both.

The silicone-amide block copolymers of formula (V) can be prepared as described in U.S. Pat. No. 6,815,468 by modifying a diamide first using the condensation chemistry as described in JP 63230781, WO 2001/68363, and U.S. Pat. No. 4,282,346; followed by the processes described in U.S. Pat. Nos. 5,981,680 and 6,051,216. Silicone-amide block copolymers of formula (V) can be prepared by one of ordinary skill in the art without undue experimentation.

The polymers described above will form stable complexes by encapsulation of the borane catalyst. Polymers of formula (III) may form complexes of formulae:

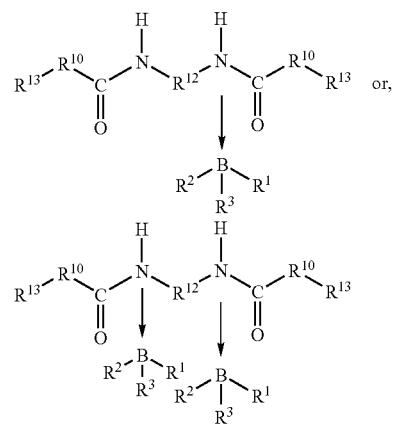

or both. Polymers of formula (IV) may form complexes of formulae:

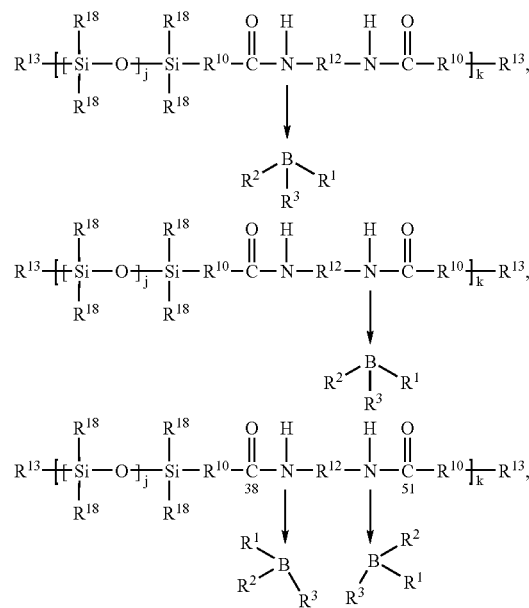

or combinations thereof. Polymers of formula (V) may form complexes of formulae:

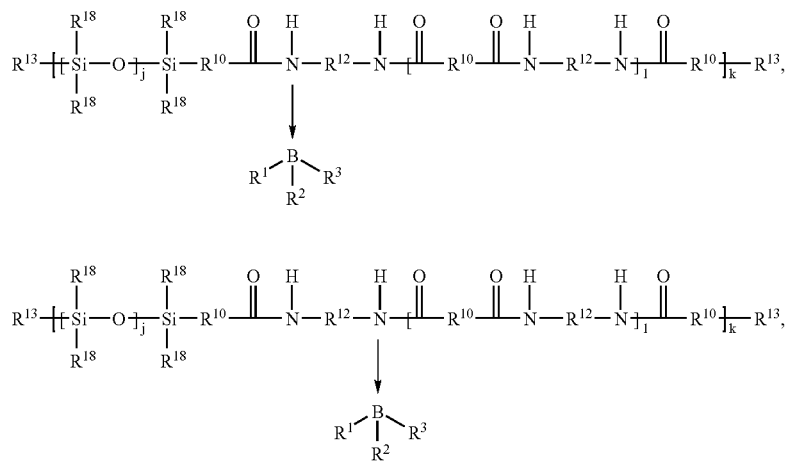

-continued

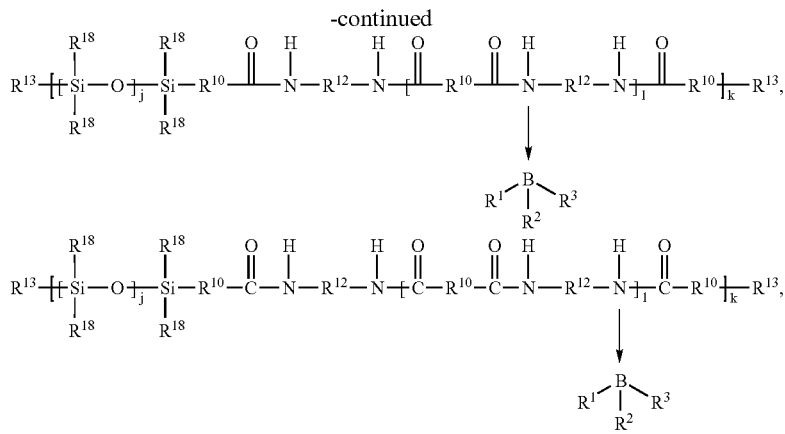

combinations thereof, or complexes in which more than one organoborane is complexed with more than one nitrogen atom. In these formulae $R^1$, $R^2$, $R^3$, $R^{10}$, $R^{12}$, $R^{13}$, $R^{18}$, j, k, and l are as described above. The number of boron atoms per molecule of each complex will depend on the ratio of the amounts of amide-functional polymer to organoborane.

It should be understood that the disclosure of ranges herein should be taken not only to disclose the range itself but also anything subsumed therein, as well as endpoints. For example, disclosure of a range of 1 to 10 should be understood to disclose not only the range of 1 to 10, but also 1, 2.7, 9 and 10 individually, as well as any other number subsumed in the range. Similarly, disclosure of a range of hydrocarbons of 1 to 5 carbon atoms should be understood to disclose not only hydrocarbons of 1 to 5 carbon atoms as a class, but also hydrocarbons of 1 carbon atom, hydrocarbons of 2 carbon atoms, hydrocarbons of 3 carbon atoms, hydrocarbons of 4 carbon atoms and hydrocarbons of 5 carbon atoms individually.

Curable Composition

The catalyst complex described above is useful for curing free-radical polymerizable monomers, oligomers, and polymers. The catalyst complex is capable of initiating polymerization or crosslinking of free radical polymerizable monomers, oligomers, or polymers, by the introduction of a decomplexer, and/or by heating. Curable compositions comprise (i) catalyst complex described above, and (ii) a free radical polymerizable monomer, oligomer, or polymer. The free radical polymerizable monomer, oligomer, or polymer can be (a) an organic compound or (b) an organosilicon monomer, oligomer, or polymer containing unsaturation and being capable of undergoing free radical polymerization.

The curable composition may optionally further comprise (iii) a decomplexer. Component (iii) is exemplified by a mineral acid, Lewis acid, carboxylic acid, carboxylic acid derivative, carboxylic acid metal salt, isocyanate, aldehyde, epoxide, acid chloride, or sulphonyl chloride. The functional groups of the decomplexer can be borne by organic molecules or organometallic compounds such as organosilanes, organopolysiloxanes, organotitanates, or organozirconates. The decomplexer can be monomeric, oligomeric, or polymeric. The decomplexer (iii) may contain free radical polymerizable groups such as acrylic acid or polyacrylic acid. In addition, the decomplexer (iii) can be attached to solid particles such as ground silica, precipitated silica, calcium carbonate, carbon black, carbon nanoparticles, silicon nanoparticles, barium sulfate, titanium dioxide, aluminum oxide, boron nitride, silver, gold, platinum, palladium, alloys thereof; or base metals such as nickel, aluminum, copper, and steel. Component (iii) should be capable of causing the catalyst complex to dissociate. In compositions not containing component (iii), those compositions can be heated to temperatures sufficient to cause the catalyst complex to dissociate.

The curable compositions are useful in preparing composite articles of manufacture in which substrates are coated or bonded together with the curable composition and cured. Such curable compositions and composite articles prepared therefrom can be used in a wide range of applications, such as in electronics, automotive, construction, sports and recreation, consumer products, and medical industries.

These curable compositions offer rapid cure rates at low temperatures, particularly when component (iii) is included. When used to prepare composite articles, the curable compositions are applied to at least one surface of a substrate. When used to manufacture composite articles, the process can be carried out by bonding the curable composition to a surface of the substrate at significantly lower temperatures, e.g., typically room temperature (RT) of 20 to 25° C. (68-77° F.), in shorter periods of time.

Free Radical Polymerizable Monomer, Oligomer or Polymer

Component (ii) is a free radical polymerizable component. Component (ii) can be an organic compound or an organometallic compound such as an organosilicon compound. In either case, it can be a single monomer, oligomer, or polymer containing unsaturation and capable of undergoing free radical polymerization. Mixtures of monomers, oligomers, and polymers can also be used. In many cases, the use mixtures of monomer, oligomers, and polymers imparts desired combination of bulk and surface properties such as cure rate, modulus, and adhesion. When component (ii) is an organic compound, the selected compound will depend on the use of the cured product. Some suitable organic compounds are described in U.S. Pat. No. 6,762,260 (Jul. 13, 2004), including organic compounds such as 2-ethylhexylacrylate, 2-ethylhexylmethacrylate, methylacrylate, methylmethacrylate, neopentyl glycol diacrylate, neopentyl glycol dimethacrylate, glycidyl acrylate, glycidyl methacrylate, allyl acrylate, allyl methacrylate, stearyl acrylate, tetrahydrofurfuryl methacrylate, caprolactone acrylate, perfluorobutyl acrylate, perfluorobutyl methacrylate, 1H, 1H, 2H, 2H-heptadecafluorodecyl acrylate, 1H, 1H, 2H, 2H-heptadecafluorodecyl methacrylate, tetrahydroperfluoro acrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethylene glycol diacrylate, diethylene glycol dimethacrylate, dipropylene glycol diacrylate, dipropylene glycol dimethacrylate, polyethylene glycol diacrylate, polyethylene glycol dimethacrylate, polypropylene glycol diacrylate, polypropylene glycol dimethacrylate, trimethylolpropane triacrylate, trimethylolpropane trimethacrylate, ethoxylated trimethylolpropane triacrylate, ethoxylated trimethylolpropane trimethacrylate, pentaerythritol triacrylate, pentaerythritol trimethacrylate, pentaerythritol tetraacrylate, pentaerythritol tetramethacrylate, methyl-3-butenoate, allyl methyl carbonate, diallyl pyrocarbonate, allyl acetoacetate, diallyl carbonate, diallyl phthalate, dimethyl itaconate, or combinations thereof. Other useful organic compounds include acrylate tipped polyurethane prepolymers prepared by reacting isocyanate reactive acrylate monomers, oligomers or polymers such as hydroxy acrylates with isocyanate functional prepolymers. Also useful are a class of conductive monomers, dopants, oligomers, polymers, and macromonomers having an average of at least one free radical polymerizable group per molecule, and the ability to transport electrons, ions, holes, phonons, or a combination thereof. For example, reference may be had to U.S. Pat. No. 5,929,194 (Jul. 27, 1999) that describes the preparation of various free radical polymerizable hole transporting compounds such as 4,4'4"-tris[N-(3(2-acryloyloxyethyloxy)phenyl)-N-phenylamino]triphenylamine, 4,4'4"-tris[N-(3(benzoyloxyphenyl)-N-phenylamino]triphenylamine, and preparation of electroluminescent devices made there from. The acrylic functional groups prefixes acryloyl- and acryl- are used interchangeably throughout this document, as are methacryloyl- and methacryl-.

When an organosilicon compound is used as component (ii), again the selected compound depends on the use of the cured product. The organosilicon compound may comprise an organosilane or an organopolysiloxane having on average at least one free radical polymerizable moiety. The organosilicon compound can be monomeric, oligomeric, polymeric, or it can be a mixture of monomers, and/or oligomers, and/or polymers. Higher molecular weight species of such free radical polymerizable compounds are often referred to as macromonomers. The organosilicon compounds can contain mono-functional or multi-functional units in the free radical polymerizable group. This allows for its polymerization to linear polymers, branched polymers of various architecture, copolymers of various architecture, or crosslinked polymeric networks. The monomers and oligomers can be any monomer or oligomer normally used to prepare addition or condensation curable polymers, or they can be monomers or oligomers used in other types of curing reactions, provided they contain at least one free radical polymerizable group.

Suitable organosilicon monomers include compounds having a structure generally corresponding to the formula $R^{21}{}_o Si(OR^{22})_{4-o}$, where subscript o ranges from 0 to 4; and where at least one of the $R^{21}$ or $R^{22}$ groups contains a free radical polymerizable group. The $R^{21}$ and $R^{22}$ groups can be independently, hydrogen; a halogen atom; or an organic group including alkyl groups, haloalkyl groups, aryl groups, haloaryl groups, alkenyl groups, alkynyl groups, acrylate functional groups, and methacrylate functional groups. The $R^{21}$ and $R^{22}$ groups may also contain other organic functional groups including glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, and hydroxyl groups.

Representative examples of free radical polymerizable organosilicon monomers include compounds such as methacryloxymethyltrimethoxysilane, 3-methacryloxypropyltrimethoxysilane, methacryloxymethyltriethoxysilane, 3-methacryloxypropyltriethoxysilane, acryloxymethyltrimethoxysilane, 3-acryloxypropyltrimethoxysilane, methacryloxymethyltrimethylsilane, 3-methacryloxypropyltrimethylsilane, acryloxymethyltriethoxysilane, 3-acryloxypropyltriethoxysilane, acryloxymethyltrimethylsilane, 3-acryloxylpropyltrimethylsilane, vinyltrimethoxysilane, allyltrimethoxysilane, 1-hexenyltrimethoxysilane, tetra (allyloxysilane), tetra(3-butenyl-1-oxy)silane, tri(3-butenyl-1-oxy)methylsilane, di(3-butenyl-1-oxy)dimethylsilane, and 3-butenyl-1-oxy trimethylsilane. Radical polymerizable moieties for these organosilicon compounds may be aliphatic unsaturated groups in which the double bond is located at the terminal positions, internal positions, or both positions relative to the functional group. Alternatively, the free radical polymerizable moiety for the organosilicon compounds may be acrylate groups or methacrylate groups.

When the free radical polymerizable organosilicon component is a monomer, oligomer, or polymer, the compound can be an organopolysiloxane having a linear, branched, hyperbranched, or resinous structure. The compound can be homopolymeric or copolymeric. The free radical polymerizable moiety for the organopolysiloxane can be an unsaturated organic group such as an alkenyl group having 2-12 carbon atoms, exemplified by the vinyl group, allyl group, butenyl group, and the hexenyl group. The unsaturated organic group can also comprise alkynyl groups having 2-12 carbon atoms, exemplified by the ethynyl group, propynyl group, and the butynyl group. The unsaturated organic group can bear the free radical polymerizable group on an oligomeric or polymeric polyether moiety such as an allyloxypoly(oxyalkylene) group or a halogen substituted analog thereof. The free radical polymerizable organic group can contain acrylate functional groups or methacrylate functional groups, exemplified by acryloxyalkyl groups such as 3-acryloxypropyl, 2-acryloxyethyl, and acryloxymethyl, groups, and methacryloxyalkyl groups such as 3-methacryloxypropyl, 2-acryloxyethyl, and acryloxymethyl groups. The unsaturated organic groups can be located at the terminal positions, pendant positions, or both the terminal and pendant positions relative to the polymer backbone. The preferred free radical polymerizable moiety for monomeric, oligomeric, and polymeric organosilicon compounds are acrylate groups and methacrylate groups.

Any remaining silicon bonded organic groups can be monovalent organic groups free of aliphatic unsaturation. The monovalent organic groups can have 1-20 carbon atoms, preferably 1-10 carbon atoms, and are exemplified by alkyl groups such as methyl, ethyl, propyl, pentyl, octyl, undecyl, and octadecyl; cycloalkyl groups such as cyclohexyl; aryl groups such as phenyl, tolyl, xylyl, benzyl, and 2-phenylethyl; alkyloxypoly(oxyalkylene) groups such as propyloxypoly(oxyethylene), propyloxypoly(oxypropylene), propyloxy-poly(oxypropylene)-co-poly(oxyethylene) groups, halogen substituted analogs thereof; cyanofunctional groups including cyanoalkyl groups such as cyanoethyl and cyanopropyl; carbazole groups such as 3-N-carbazolyl)propyl; arylamino-functional groups such as 4-(N,N-diphenylamino) phenyl-3-propyl; and halogenated hydrocarbon groups such as 3,3,3-trifluoropropyl, 3-chloropropyl, dichlorophenyl, and 6,6,6,5,5,4,4,3,3-nonafluorohexyl.

The free radical polymerizable organosilicon compound can vary in consistency from a fluid having a viscosity of 0.001 Pa·s at 25° C. to a gum. The free radical polymerizable organosilicon compound can also be a solid that becomes flowable at an elevated temperature or by the application of shear.

Component (ii) includes organopolysiloxane fluids having the formulae:
(a) $R^{23}{}_3 SiO(R^{23}{}_2 SiO)_p (R^{23} R^{24} SiO)_q SiR^{23}{}_3$,
(b) $R^{25}{}_2 R^{26} SiO(R^{25}{}_2 SiO)_r (R^{25} R^{26} SiO)_s SiR^{25}{}_2 R^{26}$, or
(c) combinations of such fluids.

In formula (a), subscript p has an average value ranging from zero to 20,000, q has an average value ranging from 1 to 20,000, r has an average value ranging from zero to 20,000, and s has an average value ranging from zero to 20,000. Each $R^{23}$ is independently a monovalent organic group. Each $R^{24}$ is independently an unsaturated monovalent organic group. Each $R^{25}$ is independently a monovalent organic group. The $R^{25}$ groups can be the same as the $R^{23}$ groups. Each $R^{26}$ is independently an unsaturated organic group.

Suitable $R^{23}$ groups are monovalent organic groups including acrylic functional groups such as acryloxymethyl, 3-acryloxypropyl, methacryloxymethyl and 3-methacryloxypropyl, groups; alkyl groups such as methyl, ethyl, propyl, and butyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5, 4,4,3,3-nonafluorohexyl groups; alkenyloxypoly(oxyalkylene) groups such as allyloxy(polyoxyethylene), allyloxypoly(oxypropylene), and allyloxy-poly(oxypropylene)-co-poly(oxyethylene) groups; alkyloxypoly(oxyalkylene) groups such as propyloxy(polyoxyethylene), propyloxypoly(oxypropylene), and propyloxy-poly(oxypropylene)-co-poly(oxyethylene) groups; halogen substituted alkyloxypoly(oxyalkylene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as aminomethyl, 2-aminoethyl, 3-aminopropyl, 6-aminohexyl, 11-aminoundecyl, 3-N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as glycidoxymethyl, 3-glycidoxypropyl, 2-(3,4,-epoxycyclohexyl)ethyl, and 5,6-epoxyhexyl groups; ester functional groups such as acetoxymethyl and benzoyloxypropyl groups; hydroxy functional groups such as hydroxy and 2-hydroxyethyl groups; isocyanate and masked isocyanate functional groups such as isocyanatomethyl, 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carbazole groups such as 3-(N-carbazolyl)propyl; arylamino-functional groups such as 4-(N,N-diphenylamino)phenyl-3-propyl; carboxylic acid functional groups such as 3-carboxypropyl and 2-carboxyethyl groups; and metal salts of carboxylic acids such as the zinc, sodium, or potassium salts of 3-carboxypropyl and 2-carboxyethyl.

The $R^{24}$ group is exemplified by alkenyl groups such as vinyl, allyl, and butenyl groups; alkynyl groups such as ethynyl and propynyl groups; and acrylic functional groups such as acryloxymethyl, 3-acryloxypropyl, methacryloxymethyl and methacryloxypropyl groups. As noted, the $R^{25}$ groups can be the same as the $R^{23}$ groups. The $R^{26}$ group is exemplified by alkenyl groups such as vinyl, allyl, and butenyl groups; alkynyl groups such as ethynyl and propynyl groups; alkenyloxypoly(oxyalkylene) groups such as allyloxy(polyoxyethylene), allyloxypoly(oxypropylene), and allyloxy-poly(oxypropylene)-co-poly(oxyethylene) groups; and acrylic functional groups such as acryloxymethyl, 3-acryloxypropyl, methacryloxymethyl and 3-methacryloxypropyl groups.

Some representative organopolysiloxane fluids suitable for use as component (i) include α,ω-methacryloxymethyl-dimethylsilyl terminated polydimethylsiloxanes, α,ω-methacryloxypropyl-dimethylsilyl terminated polydimethylsiloxanes; α,ω-acryloxymethyl-dimethylsilyl terminated polydimethylsiloxanes, α,ω-acryloxypropyl-dimethylsilyl terminated polydimethylsiloxanes; pendant acrylate functional polymers and methacrylate functional polymers such as poly (acryloxymethyl-methylsiloxy)-polydimethylsiloxane copolymers, poly(acryloxypropyl-methylsiloxy)-polydimethylsiloxane copolymers, poly(methacryloxymethyl-methylsiloxy)-polydimethylsiloxane copolymers, and poly(methacryloxypropyl-methylsiloxy)-polydimethylsiloxane copolymers; and telechelic polydimethylsiloxanes having multiple acrylate functional groups or methacrylate functional groups such as compositions formed via Michael addition of multi-acrylate monomers or multi-methacrylate monomers to amine terminated polydimethylsiloxanes. Such functionalizing reactions can be carried out a priori or in-situ.

It may be desirable to use a mixture of organopolysiloxane fluids differing in their degree of functionality, the nature of the free radical polymerizable group, or both. For example, a faster cure rate and a reduced sol content can be obtained by using a tetra-functional telechelic polydimethylsiloxane prepared by the Michael addition reaction of N-(methyl)isobutyl-dimethylsilyl terminated polydimethylsiloxane with two molar equivalents of trimethylolpropane tri-acrylate as component (i) of the composition, relative to di-functional methacryloxypropyl-dimethylsilyl terminated polydimethylsiloxanes having a similar degree of polymerization (DP). However, the latter compositions allow better working time and produce a lower modulus elastomer. Hence, combinations of component (i) having differing structures may be beneficial for different applications. Methods for preparing such organopolysiloxane fluids are known and include the hydrolysis and condensation of the corresponding organohalosilanes or the equilibration of cyclic polydiorganosiloxanes.

Component (ii) can be an organosiloxane resin including MQ resins containing $R^{27}{}_3SiO_{1/2}$ units and $SiO_{4/2}$ units; TD resins containing $R^{27}SiO_{3/2}$ units and $R^{27}{}_2SiO_{2/2}$ units; MT resins containing $R^{27}{}_3SiO_{1/2}$ units and $R^{27}SiO_{3/2}$ units; MTD resins containing $R^{27}{}_3SiO_{1/2}$ units, $R^{27}SiO_{3/2}$ units, and $R^{27}{}_2SiO_{2/2}$ units; or combinations thereof. Each $R^{27}$ group in these organosiloxane resins represents a monovalent organic group. The monovalent organic group $R^{27}$ can have 1 to 20 carbon atoms, alternatively 1 to 10 carbon atoms.

Some examples of suitable monovalent organic groups representative of the $R^{27}$ group include acrylate functional groups such as acryloxyalkyl groups; methacrylate functional groups such as methacryloxyalkyl groups; cyanofunctional groups; and monovalent hydrocarbon groups. Monovalent hydrocarbon groups include alkyl groups such as methyl, ethyl, propyl, pentyl, octyl, undecyl, and octadecyl groups; cycloalkyl groups such as cyclohexyl groups; alkenyl groups such as vinyl, allyl, butenyl, and hexenyl groups; alkynyl groups such as ethynyl, propynyl, and butynyl groups; aryl groups such as phenyl, tolyl, xylyl, benzyl, and 2-phenylethyl groups; halogenated hydrocarbon groups such as 3,3,3-trifluoropropyl, 3-chloropropyl, dichlorophenyl, and 6,6,6,5,5, 4,4,3,3-nonafluorohexyl groups; and cyano-functional groups including cyanoalkyl groups such as cyanoethyl and cyanopropyl groups.

The $R^{27}$ group can also comprise an alkyloxypoly(oxyalkylene) group such as propyloxy(polyoxyethylene), propyloxypoly(oxypropylene) and propyloxy-poly(oxypropylene)-co-poly(oxyethylene) groups; halogen substituted alkyloxypoly(oxyalkylene) groups such as perfluoropropyloxy(polyoxyethylene), perfluoropropyloxypoly(oxypropylene) and perfluoropropyloxy-poly(oxypropylene)-co-poly (oxyethylene) groups; alkenyloxypoly(oxyalkylene) groups such as allyloxypoly(oxyethylene), allyloxypoly(oxypropylene) and allyloxy-poly(oxypropylene)-co-poly(oxyethylene) groups; alkoxy groups such as methoxy, ethoxy, n-propoxy, isopropoxy, n-butoxy and ethylhexyloxy groups; aminoalkyl groups such as aminomethyl, 2-aminoethyl, 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; hindered aminoalkyl groups such as tetramethylpiperidinyl oxypropyl groups; epoxyalkyl groups such as 3-glycidoxypropyl, 2-(3,4,-epoxycyclohexyl)

ethyl, and 5,6-epoxyhexyl groups; ester functional groups such as acetoxymethyl and benzoyloxypropyl groups; hydroxy functional groups such as hydroxy and 2-hydroxyethyl groups; isocyanate and masked isocyanate functional groups such as isocyanatomethyl, 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carbazole groups such as 3-(N-carbazolyl)propyl; arylamino-functional groups such as 4-(N,N-diphenylamino)phenyl-3-propyl; carboxylic acid functional groups such as 3-carboxypropyl, 2-carboxyethyl, and 10-carboxydecyl groups; and metal salts of carboxylic acids such as zinc, sodium, and potassium salts of 3-carboxypropyl and 2-carboxyethyl.

The organosiloxane resin can contain an average of 1 to 40 mole percent of free radical polymerizable groups such as unsaturated organic groups. The unsaturated organic groups may be an alkenyl group, alkynyl group, acrylate-functional group, methacrylate-functional group, or a combination of such groups. The mole percent of unsaturated organic groups in the organosiloxane resin is considered herein to be the ratio of (i) the number of moles of unsaturated groups containing siloxane units in the resin, to (ii) the total number of moles of siloxane units in the resin, times a factor of 100. Some specific examples of suitable organosiloxane resins that are useful as component (i) are $M^{Methacryloxymethyl}Q$ resins, $M^{Methacryloxypropyl}Q$ resins, $MT^{Methacryloxymethyl}T$ resins, $MT^{Methacryloxypropyl}T$ resins, $MDT^{Methacryloxymethyl}T^{Phenyl}T$ resins, $MDT^{Methacryloxypropyl}T^{Phenyl}T$ resins, $M^{Vinyl}T^{Phenyl}$ resins, $TT^{Methacryloxymethyl}$ resins, $TT^{Methacryloxypropyl}$ resins, $T^{Phenyl}T^{Methacryloxymethyl}$ resins, $T^{Phenyl}T^{Methacryloxypropyl}$ resins, $TT^{Phenyl}T^{Methacryloxymethyl}$ resins, and $TT^{Phenyl}T^{Methacryloxypropyl}$ resins, where M, D, T, and Q have the same meanings as defined above.

Methods of preparing such organosiloxane resins are known including resins made by treating a resin copolymer produced by a silica hydrosol capping process, with an alkenyl containing endblocking reagent, as described in U.S. Pat. No. 2,676,182 (Apr. 20, 1954). This method involves reacting a silica hydrosol under acidic conditions with a hydrolyzable triorganosilane such as trimethylchlorosilane, a siloxane such as hexamethyldisiloxane, or a mixture thereof, followed by recovery of a copolymer having M and Q units. The copolymer typically contains about 2-5 percent by weight of hydroxyl groups. Organosiloxane resins containing less than 2 percent by weight of silicon bonded hydroxyl groups may then be prepared by reacting the copolymer with an endblocking agent containing unsaturated organic groups, and with an endblocking agent free of aliphatic unsaturation, in an amount sufficient to provide 3-30 mole percent of unsaturated organic groups in the product. Some suitable endblocking agents include silazanes, siloxanes, and silanes; and preferred endblocking agents are described in U.S. Pat. No. 4,584,355 (Apr. 22, 1986), U.S. Pat. No. 4,585,836 (Apr. 29, 1986), and U.S. Pat. No. 4,591,622 (May 22, 1986). A single endblocking agent or a mixture of endblocking agents may be used to prepare such organosiloxane resins.

Another type of organosilicon compound that can be used as component (i) is a composition formed by copolymerizing an organic compound having a polymeric backbone, with an organopolysiloxane, where an average of at least one free radical polymerizable group is incorporated per molecule. Some suitable organic compounds include hydrocarbon based polymers such as polyisobutylene, polybutadienes, and polyisoprenes; polyolefins such as polyethylene, polypropylene and polyethylene polypropylene copolymers; polystyrenes; styrene butadiene; and acrylonitrile butadiene styrene; polyacrylates; polyethers such as polyethylene oxide or polypropylene oxide; polyesters such as polyethylene terephthalate or polybutylene terephthalate; polyamides; polycarbonates; polyimides; polyureas; polymethacrylates; and partially fluorinated or perfluorinated polymers such as polytetrafluoroethylene; fluorinated rubbers; terminally unsaturated hydrocarbons, olefins and polyolefins. The organic compound can be a copolymer of any of these compounds, including polymers containing multiple organic functionality, multiple organopolysiloxane functionality, or combinations of organopolysiloxanes and organic compounds. The copolymeric structures can vary in the arrangement of repeating units from random, grafted, to being blocky in nature.

Component (ii), in addition to bearing on average at least one free radical polymerizable group, may have a physical transition temperature, bear an organofunctional group with a physical transition temperature, or upon curing form matrices that have a physical transition temperature, i.e., glass transition or melting transition, such that the composition undergoes changes marked by a softening or non-linear reduction in its viscosity on reaching certain temperatures under the conditions of use. Such organopolysiloxane matrices are useful for phase change compositions such as those found to be useful in thermal interface materials for electronic components. The organopolysiloxane matrix may be an organofunctional silicone wax. The wax can be an uncrosslinked organofunctional silicone wax, a crosslinked organofunctional silicone wax, or a combination of waxes. Silicone waxes such as these are commercially available and are described in U.S. Pat. No. 6,620,515 (Sep. 16, 2003). When the organofunctional silicone wax bears at least one free radical polymerizable group such as an acrylate or methacrylate group, it is useful to impart phase changes when used as component (ii). Component (ii) can also comprise a mixture of any of the organic compounds, organosilicon compounds, and/or organopolysiloxane compounds described above.

The Decomplexer (iii)

The curable composition may contain a decomplexer (iii) that is capable of initiating the polymerization or crosslinking when mixed with component (ii) and exposed to an oxygenated environment. The decomplexer may be a liquid, gas, or solid. The decomplexer may be a small molecule, a monomer, an oligomer, a polymer, or a mixture thereof, and may also be diluted or borne by a carrier such as an aqueous or nonaqueous solvent, or by a filler particle. The decomplexer may contain free radical polymerizable groups or other functional groups such as a hydrolyzable group. The amine reactive groups on the decomplexer may be borne on an organic, organosilicon, or organopolysiloxane compound. The presence of component (iii) allows initiation of polymerization or crosslinking to occur at temperatures below the dissociation temperature of component (i), including room temperature (RT) and below. To achieve storage stability of the curable composition in the presence of oxygen, it is preferred that components (i) and (iii) be physically or chemically isolated. Thus, curable compositions containing components (i), (ii), and (iii) can be rendered air stable by packaging component (iii) separately from component (i) in multi-component formulations. Alternatively, components (i) or (iii), or both components (i) and (iii), can be encapsulated, or delivered in separate phases to form a one-component formulation. This may be accomplished by introducing one or both of components (i) and (iii) in a solid form or forms that prevents intimate mixing of components (i) and (iii). Curing of the curable composition can be activated by heating it above the softening temperature of the solid phase component or encapsulant, or by introducing a solubilizing agent that allows mixing of components (i) and (iii). Components (i) and (iii) can also be combined in a single container without the occurrence of significant polymerization or crosslinking, by packaging the components (i) and (iii) in a container where the mixing conditions are anaerobic.

Some examples of decomplexers having amine reactive groups capable of rapidly initiating polymerization or curing in the presence of oxygen include mineral acids; Lewis acids; carboxylic acids; carboxylic acid derivatives such as anhydrides and succinates; carboxylic acid metal salts; isocyanates; aldehydes; epoxides; acid chlorides; and sulphonyl chlorides. Suitable decomplexers include acrylic acid, methacrylic acid, polyacrylic acid, polymethacrylic acid, methacrylic anhydride, polymethacrylic anhydride, undecylenic acid, oleic acid, lauric acid, lauric anhydride, citraconic anhydride, ascorbic acid (Vitamin C), methylene bis-(4-cyclohexylisocyanate) monomers or oligomers, hexamethylene diisocyanate monomers or oligomers, toluene-2,4-diisocyanate monomers or oligomers, methylene diphenyl isocyanate monomers or oligomers, isophorone diisocyanate monomers or oligomers, (methacryloyl)isocyanate, 2-(methacryloyloxy)ethyl acetoacetate, undecylenic aldehyde, and dodecyl succinic anhydride.

To improve the compatibility of the decomplexer in curable compositions containing organosiloxane matrices, it may be advantageous when the decomplexer comprise an organosilane, or an organopolysiloxane having amine reactive groups. Some examples include 3-isocyanatopropyltrimethoxysilane; 3-glycidoxypropyltrimethoxysilane; propylsuccinic anhydride functionalized linear, branched, resinous, and hyperbranched organopolysiloxanes; cyclohexenyl anhydride functional linear, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes. The '512 patent describes other silicon containing compounds that can be used, including compounds that release an acid when exposed to moisture. In addition, the '512 patent discloses other types of amine reactive decomplexation agents that can be used.

Other compounds that can be used include compounds capable of generating amine reactive groups when exposed to ultraviolet radiation such as a photoacid generator. Examples of such compounds include iodonium salts containing $[SbF_6]^-$ counterions. In such an embodiment, it may be useful to optionally include a photosensitizing compound such as isopropylthioxanthone.

The curable composition can be stabilized by attaching the decomplexer to solid particles. This procedure enables one to control the working time, and it stabilizes the liquid phase containing the decomplexer against separation from the rest of the curable composition during storage. Attachment of the decomplexer to the solid particles can be accomplished by known surface treatment techniques that can be carried out in-situ or a priori. Some surface treatment methods include using a condensation reactive compound to pre-treat solid particles such as ground or precipitated silica, calcium carbonate, carbon black, carbon nanoparticles, silicon nanoparticles, barium sulfate, titanium dioxide, aluminum oxide, zinc oxide, boron nitride, silver, gold, platinum, palladium, and alloys thereof; or to pre-treat base metals such as nickel, aluminum, copper, and steel. The pretreatment is followed by reaction of the pre-treated solid particles with a compound having amine reactive groups, or by the direct treatment of the pre-treated solid particles with a decomplexer having hydrolyzable moieties. Some examples of condensation reactive compounds include isocyanatomethyltriethoxysilane, 3-isocyanatopropyltriethoxysilane, isocyanatomethyltrimethoxysilane, 3-isocyanatopropyltrimethoxysilane, triethoxysilylundecanal, glycidoxymethyltrimethoxysilane, 3-glycidoxypropyltrimethoxysilane, (triethoxysilyl)methylsuccinic anhydride, 3-(triethoxysilyl)propylsuccinic anhydride, and 2-(4-chlorosulfonylphenyl)ethyltrimethoxysilane. Attachment of the decomplexer to the solid particles can also be accomplished by mixing an acid functional compound with solid particles having an appropriate surface functionality under conditions conducive to formation of an acid base complex, a hydrogen bonded complex, or an acid salt.

Some fillers are commercially available and are already pre-treated with surface treating agents referred to as lubricants, or can be obtained with impurities that contain amine reactive groups such as carboxylic acid. In this way, component (iii) can be delivered together in the form of a treated filler. The advantage obtained in that instance is that the reaction between the catalyst complex and the amine reactive groups on the filler can help remove the lubricant from the surface of the filler particles. It may also be advantageous for the sake of stability to use a combination of fillers containing amine reactive groups, and fillers that are inert with respect to amine compounds.

Some representative examples of amine reactive groups useful (iii) include carboxylic acid, anhydride, isocyanate, aldehydes, and epoxies. Blocked isocyanates may be useful in cases where instead of ambient polymerization, it is desirable to use heat to initiate polymerization rapidly.

Optional Ingredients (iv)

Some ingredients that can be included in the curable compositions herein include fillers such as reinforcing fillers, extending fillers, electrically conductive fillers, and thermally conductive fillers; adhesion promoters; crosslinking agents; combinations of polymers, crosslinkers and catalysts useful for providing a secondary cure of the matrix; polymers capable of extending, softening, reinforcing, toughening, modifying viscosity, or reducing volatility when mixed into the composition; spacers; dyes; pigments; UV stabilizers; aziridine stabilizers; void reducing agents; cure modifiers such as hydroquinone and hindered amines; free radical initiators such as organic peroxides and ozonides; organoborane-amine complexes; comonomers such as organic acrylates and methacrylates; polymers; diluents; rheology modifiers; acid acceptors; antioxidants; oxygen scavengers; oxygen sponges; oxygen release agents; oxygen generators; heat stabilizers; flame retardants; silylating agents; foaming agents; foaming catalysts; foam stabilizers; surfactants; wetting agents; solvents; diluents; plasticizers; fluxing agents; and desiccants.

In particular, some examples of electrically conductive fillers that can be used as an optional ingredient include metal particles, conductive non-metal particles, metal particles having an outer surface of a metal, or conductive non-metal particles having an outer surface of a metal. The outer surface metal can be silver, gold, platinum, palladium, nickel, aluminum, copper, or steel. Some examples of thermally conductive fillers that can be used as an optional ingredient include metal particles, metal oxide particles, thermally conductive non-metal powders, or combinations thereof. The thermally conductive filler can be aluminum, copper, gold, nickel, silver, alumina, magnesium oxide, beryllium oxide, chromium oxide, titanium oxide, zinc oxide, barium titanate, diamond, graphite, carbon nanoparticles, silicon nanoparticles, boron nitride, aluminum nitride, boron carbide, titanium carbide, silicon carbide, tungsten carbide, or combinations thereof.

Processing & Manufacturing

Curable composition according to the invention can be prepared by combining and mixing:
A. 0.1-50 parts by weight of (i) the organosilicon functional boron catalyst complex with an amide-functional polymer sufficient to cure the composition, the amount of A depending on various factors including the molecular weight of the complex and the number of boron atoms per molecule;
B. 1-100 parts by weight of (ii) the free radical polymerizable monomer, oligomer or polymer;

C. 0 to 50 parts by weight of (iii) the decomplexer sufficient to decomplex boron, the amount of C depending on various factors including the molecular weight of the decomplexer;
D. 0 to 1000 parts by weight of one or more (iv) optional ingredients; the parts by weight of A-D being based on the total weight of the curable composition.

The working time and extension of shelf stability of curable compositions of the invention can be controlled by introducing additional amide compounds to increase the molar ratio of the amide groups to boron atoms in the composition. The effective amount to be added depends on the amide:boron ratio used in component (i). It is preferred that the overall amide:boron ratio remain sufficiently low to permit polymerization to occur. A suitable amide:boron ratio would be less than 10:1, preferably less than 4:1. When the decomplexer (iii) is already present in the curable composition, for example when residual carboxylic acid is present on filler particles, a higher level of amide compounds may be added to neutralize or partially neutralize the amide reactive groups for storage stability. The amide compound may contain monofunctional or multi-functional amide groups, and it can comprise a primary amide, secondary amide, tertiary amide, or a combination thereof. The amide compound can contain free radical polymerizable groups or other functional group such as hydrolyzable groups. The decomplexer can be monomeric, oligomeric, or polymeric. Amide groups may be borne on an organic, organosilicon, or organopolysiloxane compound.

Composite articles according to the invention may comprise curable compositions that are disposed or applied to a single substrate or between multiple substrates. The substrate or substrates can be organic, thermoplastic, thermosetting, metallic, ceramic, or other suitable inorganic material. The substrates can be multi-layered substrates such as substrates used in printed circuit boards in which improved adhesion is desired between the curable compositions and the substrate or substrates of the composite article.

The composite articles can be made by bonding the curable composition to at least one surface of the substrate in the composite article. This can be performed by curing the composition sufficiently to obtain adherence such that the curable composition and the substrate are bonded together securely to form the composite article.

The cure temperature may range from −40° C. to 80° C., alternatively 0° C. to 60° C., and alternatively 15° C. to 35° C. The time for curing the curable composition on the substrate can range from 5 seconds to 24 hours, alternatively 30 seconds to 2 hours. This assures that the composition is sufficiently cured and fully adhered to the substrate. The curable composition can be applied to substrates by meter mixing, extruding, and/or the use of robotic or manual manipulation.

Fully bonded composite articles can be made by disposing the curable composition to at least one surface of at least one substrate at a temperature less than the boiling point of water (i.e., 100° C.), and then concurrently curing the curable composition and bonding it to the substrate(s). This obviates the need to pre-dry the substrate(s). Composite articles can also be cured and bonded in a similar fashion at room temperature.

As noted above, the curable compositions can be easily packaged and delivered as multiple-component formulations or as one-component formulations. Combinations of components (i), (ii), and (iii) may be used as parts of multiple-component packages when components (i) and (iii) are maintained separate from one another. For example, a portion of (ii) the free radical polymerizable monomer, oligomer or polymer, and (i) the catalyst complex, can be packaged together in one part, while the remaining portion of (ii) the free radical polymerizable monomer, oligomer or polymer, and (iii) the decomplexer, are packaged together in a second part. If desired, component (iii) can be delivered in the form of a filler treated with the decomplexer (iii), and packaged separately from component (i). Components (i)-(iii) can also be stored together in 1-part formulations as long as oxygen is not present.

In the embodiment where the decomplexer (iii) is borne on a filler and all the components are combined into a single package, components (i), (ii) and (iii) may be mixed, packaged, and stored in a substantially oxygen free environment, to avoid premature thickening.

In two part formulations, it may be advantageous for the sake of stability, to use a combination of fillers containing amide reactive groups and fillers that are inert with respect to amide compounds. For example, in a two part formulation, the filler that is inert with respect to amide compounds, can be combined with component (i). The filler bearing amide reactive groups can serve as component (iii) and be packaged in a separate container from component (i). In that case, component (ii) can be included with either part of the formulation, or with both parts. Alternatively, (iii) the decomplexer can be introduced under conditions allowing it to be delivered in the gas phase to a pre-mixed mold filled with a composition containing components (i) and (ii). This allows extended working time, followed by rapid curing upon exposure to air.

Mixing and dispensing of multi-part packages can be performed in several ways. For example, the ingredients can be mixed at the desired volume ratio in air in a bag, or through a pressurized gun. The '512 patent describes several devices capable of mixing and dispensing two-part packages. It is also beneficial to tailor the viscosity and density of two-part packages to achieve efficient mixing and dispensing. Fillers of varying density and viscosity modifiers such as solvents, monomers, and polymers, can be used to impart control of these properties. In addition, it is beneficial to exclude oxygen from the environment in the mixing device before dispensing it on a substrate, to minimize pre-mature curing and plugging of the mixing and dispensing device. While there are no limitations on the mixing ratio between the components in multi-part packages, volume ratios may be maintained at 0.05:1 to 20:1, and alternatively 0.1:1 to 10:1 for two-part packages.

The curable compositions of the invention are useful for preparing rubbers, tapes, adhesives, protective coatings, thin films, electronic components, photonic components, acoustic dampening components, thermoplastic and thermosetting monolithic molded parts such as toys or auto-body panels, sealants, foams, gaskets, seals, o-rings, connectors, and pressure sensitive adhesives. Depending the choice of materials, cured compositions may range in properties from compliant gels to rigid resins. These curable compositions are especially useful for preparing self-adherent silicone elastomers and gels. Silicone elastomers and gels have numerous applications including their use as die attach adhesives, lid sealants, encapsulants, gaskets, o-rings, potting compounds, and as conformal coatings. Silicone elastomers of the invention are capable of releasing from metal molds while at the same time adhering selectively to polymeric surfaces. Accordingly, the silicone elastomers can be co-molded or over-molded with polymeric resins in forming integrally bonded parts, such as connectors and housings for electrical wiring or electronic circuits, and diving masks for scuba diving. Silicone adhesives are useful for bonding electronic components to flexible or rigid substrates.

When an electrically conductive filler is used as an optional ingredient, it should be included in an amount sufficient to impart electrical conductivity to the curable composition. Curable compositions of this kind can be used for assembling electronic components, as substitutes for soldering, as electrical interface materials, and as conductive inks. The curable compositions can be delivered as rigid parts or flexible elastomers, and can be dispensed, pre-cured in rolls, or in sheet form as films, for application as pressure sensitive adhesives. They can also be dispensed and cured in place in some final applications. Foamed electrically conductive curable compositions can be used as gaskets and seals in applications such as in electrical and electronic housings, to prevent transmission of electromagnetic and radio frequency noise across sealed areas.

When a thermally conductive filler is used as an optional ingredient, it should be included in an amount sufficient to impart thermal conductivity to the cured product of the curable composition. Thermally conductive curable compositions are similarly useful for preparing thermally conductive rubbers, thermally conductive tapes, thermally conductive curable adhesives, thermally conductive foams, and thermally conductive pressure sensitive adhesives. The curable compositions are especially useful for preparing thermally conductive silicone adhesives. Thermally conductive silicone adhesives have numerous applications including their use as die attach adhesives, solder replacements, and thermally conductive coatings and/or gaskets. Thermally conductive silicone adhesives are especially useful for bonding electronic components to flexible and/or rigid substrates.

Thermally conductive curable compositions can also be used for assembling electronic components, as substitutes for soldering, as thermal interface materials, and as thermally conductive inks and/or greases. The curable compositions can be in the form of rigid parts or flexible elastomers, and can be pre-cured and dispensed in rolls or sheets as films, for application as pressure sensitive adhesives. They can also be dispensed wet and cured in place in final applications. Partially cured thermally conductive compositions can be used as thermally conductive greases. Foamed thermally conductive compositions can be used as gaskets and seals in electrical and electronic housings. When the curable composition is used as a thermally conductive adhesive, the curable composition is particularly useful as a thermal interface material, in that it is capable of providing good bonding strength between heat sinks, heat spreaders, or heat dissipation devices, especially where the heat sink or heat dissipation device has a polymeric matrix.

EXAMPLES

The following examples are set forth in order to illustrate the invention in more detail. Where number or weight average molecular weights are provided in these examples, the values were determined by gel permeation chromatography (GPC) using tetrahydrofuran as the solvent, and calibrated with mono-disperse polystyrene standards.

Example 1

Preparation of Oxyalkylene-Amide

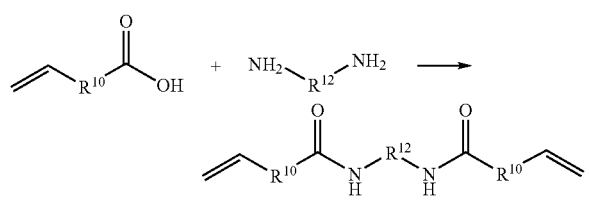

A 500 mL round bottom flask equipped with a thermometer, electrical stirrer, nitrogen sweep, and a condenser, was charged with 72.02 grams triethyleneglycoldiamine (XTJ-504 Huntsman, Houston, Tex.) and 184.79 grams of undecylenic acid (Atofina, France). With the stirring off, the mixture in the flask was purged with nitrogen for 5 minutes to sweep out any oxygen in the headspace. The mixer was then turned on, and the mixture quickly turned to a light yellow color as soon as the two reactants reacted. The resulting mixture was then heated to 120° C. and maintained at this temperature for 1 hour. Next, the reaction was allowed to continue at this temperature for 1 hour. The materials were then heated at 220° C. for 2 hours and further heated to 240° C. and held there for 2 hours under vacuum with a nitrogen purge to strip out impurities.

The resulting reaction mixture was cooled to 150° C., poured into an aluminum-lined pan, and allowed to cool in air. The melt temperature of the resulting polyetheramide was 89° C. The acid and base numbers as indication of the impurities remain in the polyether-amide were 0.073 and 0.28, respectively. The acid number is defined as gram of equivalent KOH needed to neutralize 1000 gram of sample, whereas the base number is defined as gram of equivalent HCl needed to neutralize 1000 gram of sample.

Example 2

Preparation of Si-Oxyalkyleneamide

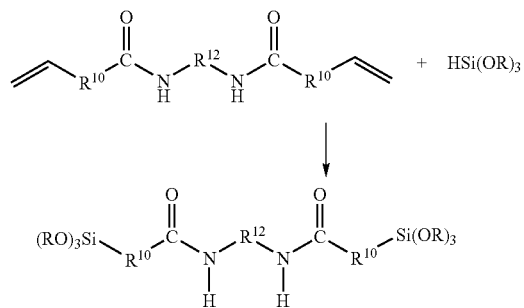

A 1000 mL, three neck, round bottom flask equipped with a temperature probe, an electrical stirrer, and a condenser was charged with 50 grams of the polyether-amide of Example 1 and 50 g of toluene, and heated at 115° C. for 15 minutes to dissolve the polyetheramide. Then, 154 g of a dimethylhydrogen endblocked polydimethyl siloxane having the average formula:

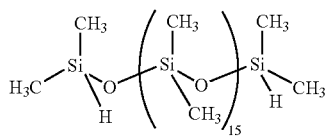

was added drop wise via an addition funnel. After addition of the first 5 grams of the siloxane, 0.28 gram of a platinum catalyst (1,3-diethenyl-1,1,3,3-tetramethyldisiloxane platinum complex in dimethyl siloxane) was added to the mixture. When the siloxane addition was complete, a further 0.2 gram of catalyst was added and mixed for an additional 1 hour. The reaction mixture was then heated to 120° C. and vacuum applied slowly to reduce the pressure to below 10 mm Hg so as to remove the solvent. The Mw of the resulting polymer was 58300 and polydispersity of 3.75. The melt temperature was 40.5° C.

Reference Example 3

General Procedure for the Synthesis of Complexes

An organosilicon functional borane-amine catalyst complex with an amide-functional polymer was synthesized by the hydroboration of an allylsilane or a vinylsilane containing monomer/polymer, with $BH_3$-THF (tetrahydrofuran) in an oxygen free environment. A three neck round bottom flask, equipped with a magnetic stirring bar, a thermometer, a condenser, and a rubber septum, was charged with a solution of $BH_3$-THF, via a syringe and needle. The mixture was held at 0° C. An appropriate silane was then added, and the mixture was stirred for three hours at room temperature. The resulting hydroboration product was treated with an appropriate amide copolymer, to form an air stable organosilicon functional borane-amide copolymer catalyst complex.

Example 4

Synthesis of a B-[2-(trimethylsilyl)propyl]-9-borabicyclo[3,3,1]nonane-amide Catalyst Complex An air stable catalyst was prepared from the reaction of a triorganoborane with a silicone-amide copolymer. The organoborane was prepared from hydroboration of 9-BBN (9-borabicyclo[3,3,1]nonane) with allyltrimethylsilane and complexed with oxyalkylene-amide of Example 1. In a three neck round bottom flask, equipped with a magnetic stirring bar, a thermometer, a condenser, and a rubber septum, was charged with 30 mL of a 0.5 M 9-BBN (9-borabicyclo[3,3,1]nonane)-THF solution (0.015 mol) via a syringe and needle, the mixture was cooled at 0° C. One molar equivalent of allyltrimethylsilane (1.71 gram, 0.015 mol) was added to the mixture dropwise via a syringe and a needle, the mixture was stirred for 3 hours at room temperature under a dry nitrogen purge. The resulting hydroboration product was treated under a dry nitrogen purged atmosphere with 10 g of oxyalkyleneyetheramide (example 1) dissolved in 30 mL of dry THF. To 90 parts of a methacryloxypropyldimethylsiloxy terminated PDMS having a number average molecular weight of 950 g/mol, was added 5 parts of the catalyst complex. The mixture was thoroughly homogenized with spatula prior to adding 5 parts of isophorone diisocyanate. The cured material was opaque.

Example 5

Preparation of Triethylborane-Amide Copolymer Catalyst Complex

In a 500 mL three neck round bottomed flask was charged 8 g of Si-oxyalkyleneamide prepared in Example 2 and 50 mL of THF. After the amide was completely dissolved, 5 mL of tributylborane of 1 M THF solution was added dropwise at room temperature. The material was mixed for 3 h at room temp. The solvent was removed under vacuum giving waxy material. The resulting complex was air stable, when this complex was mixed with butylmethacrylate, no polymerization was observed. However, when isophorone diisocyanate was introduced, the complex initiated polymerization of butylmethacrylate. Similarly, the complex initiated the polymerization of acrylate solution prepared from mixture of 80% methylmethacrylate and 20% polymethylmethacrylate PMMA with 350,000 molecular weight in the presence of isophorone diisocyanate.

Example 6

Synthesis of a Tri(Trimethylsilylpropyl)-Borane-Amide Catalyst Complex

In a three neck round bottom flask, equipped with a magnetic stirring bar, a thermometer, a condenser, and a rubber septum, was charged with 30 mL of a 1.0 molar $BH_3$-THF solution (0.03 mol) via a syringe and needle, and the mixture was cooled at 0° C. Three molar equivalents of allyltrimethylsilane (10.26 gram, 0.09 mol) was added to the mixture dropwise via a syringe and a needle, and the mixture was stirred for 3 hours at room temperature under a dry nitrogen purge. The resulting hydroboration product was treated under a dry nitrogen purged atmosphere with 20 g of Si-oxyalkylene-amide (from example 2) dissolved in 30 mL of dry THF. The THF was removed under reduced pressure to obtain an air stable catalyst complex. The resulting complex was air stable, when this complex was mixed with methylmethacrylate or no polymerization was observed in the absence of decomplexer. When 5 parts of the complex was added to 90 parts of a methacryloxypropyldimethylsiloxy terminated PDMS having a number average molecular weight of 950 g/mol, and the mixture was thoroughly homogenized with spatula prior to adding 5 parts of isophorone diisocyanate, a white elastomeric polymer formed.

Other variations may be made in compounds, compositions, and methods described herein without departing from the essential features of the invention. The embodiments of the invention specifically illustrated herein are exemplary only and not intended as limitations on their scope except as defined in the appended claims.

INDUSTRIAL APPLICABILITY

The organosilicon functional boron catalyst complexes with amide functional polymers of this invention may provide the benefits of better shelf life, better pot life, or both in curable compositions containing these catalyst complexes as compared to similar compositions containing other organosilicon functional boron amine catalyst complexes. The catalyst complexes of this invention may also improve adhesion of a cured product of curable compositions containing these catalyst complexes as compared to cured products of similar compositions containing other organosilicon functional boron amine catalyst complexes. Potential applications for the catalyst complexes of this invention include automotives and electronics. Improved adhesion to plastics is one of the primary applications for this invention. This invention may also be used in applications where inhibition resistant formulations are required. These catalyst complexes are expected to improve product pot life. This catalyst complex is expected to improve compatibility with silicone matrix since both complexer and catalyst contain silicone.

The invention claimed is:

1. A catalyst complex having a formula:

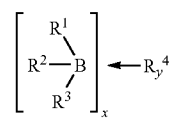

where subscript x is one or more, subscript y is one or more, $R^1$, $R^2$, and $R^3$ are each independently selected from the group consisting of hydrogen, a cycloalkyl group, a linear or branched alkyl group having 1-12 carbon atoms, an alkylaryl group, an organosilane group, an organosiloxane group, an alkylene group capable of functioning as a covalent bridge to another boron atom, a divalent organosiloxane group capable of functioning as a covalent bridge to another boron atom, and substituted analogs thereof; where at least one of the $R^1$, $R^2$, or $R^3$ groups optionally contains one or more silicon atoms, and the silicon-containing group is covalently attached to boron, and where $R^4$ comprises units of formula (IV):

(IV)

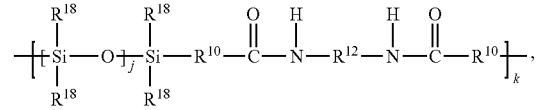

where subscript j ranges from 1 to 700, subscript k ranges from 1 to 300, each $R^{10}$ is independently a divalent organic group, a divalent silicone group, or a divalent silicone-organic block copolymer, each $R^{12}$ is independently a divalent organic group, each $R^{18}$ is independently selected from the group consisting of an alkyl group, a halogenated alkyl group, a chain comprising siloxane, and an aryl group.

2. A catalyst complex having a formula:

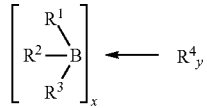

where subscript x is one or more, subscript y is one or more, $R^1$, $R^2$, and $R^3$ are each independently selected from the group consisting of hydrogen, a cycloalkyl group, a linear or branched alkyl group having 1-12 carbon atoms, an alkylaryl group, an organosilane group, an organosiloxane group, an alkylene group capable of functioning as a covalent bridge to another boron atom, a divalent organosiloxane group capable of functioning as a covalent bridge to another boron atom, and substituted analogs thereof; where at least one of the $R^1$, $R^2$, or $R^3$ groups optionally contains one or more silicon atoms, and the silicon-containing group is covalently attached to boron, and where $R^4$ comprises units of formula (V):

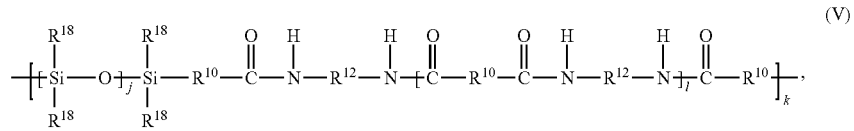

where subscript j ranges from 1 to 700, subscript k ranges from 1 to 300, subscript l ranges from 1 to 60, each $R^{10}$ is independently a divalent organic group, a divalent silicone group, or a divalent silicone-organic block copolymer, each $R^{12}$ is independently a divalent organic group, each $R^{18}$ is independently selected from the group consisting of an alkyl group, a halogenated alkyl group, a chain comprising siloxane, and an aryl group.

* * * * *